US009038375B2

(12) United States Patent
Iwasaki et al.

(10) Patent No.: US 9,038,375 B2
(45) Date of Patent: May 26, 2015

(54) HYDRAULIC WORKING MACHINE (75) Inventors: Satoshi Iwasaki, Tsuchiura (JP); Kouji Ishikawa, Tsuchiura (JP); Hidetoshi Satake, Tsuchiura (JP); Takato Satake, legal representative, Ibaraki (JP); Takatoshi Ooki, Tsuchiura (JP); Shinji Nishikawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 114 days.

(21) Appl. No.: 13/819,375

(22) PCT Filed: Aug. 25, 2011

(86) PCT No.: PCT/JP2011/069185
§ 371 (c)(1),
(2), (4) Date: May 1, 2013

(87) PCT Pub. No.: WO2012/029628
PCT Pub. Date: Mar. 8, 2012

(65) Prior Publication Data
US 2013/0209283 A1    Aug. 15, 2013

(30) Foreign Application Priority Data
Aug. 31, 2010 (JP) ................. 2010-194193

(51) Int. Cl.
*F01N 3/00*  (2006.01)
*F01N 3/02*  (2006.01)
(Continued)

(52) U.S. Cl.
CPC . *F04B 7/00* (2013.01); *B60K 6/485* (2013.01); *B60W 10/06* (2013.01); *B60W 10/08* (2013.01); *B60W 2710/083* (2013.01);
(Continued)

(58) Field of Classification Search
USPC ................... 60/286, 295, 311, 431
See application file for complete search history.

(56) References Cited

U.S. PATENT DOCUMENTS

2005/0155345 A1 * 7/2005 Nakamura ............ 60/311
2009/0093331 A1 * 4/2009 Iwanaka et al. ........ 475/5
2011/0173958 A1 * 7/2011 Masuda et al. ......... 60/285

FOREIGN PATENT DOCUMENTS

EP    1199411 B1 * 10/2006 ........... E02F 9/20
JP    6-212949 A    8/1994
(Continued)

OTHER PUBLICATIONS

International Search Report dated Nov. 29, 2011 including English-language translation (Two (2) pages).
Chinese Office Action dated Aug. 5, 2014 (six (6) pages).

*Primary Examiner* — Audrey K Bradley
(74) *Attorney, Agent, or Firm* — Crowell & Moring LLP (57) ABSTRACT An exhaust gas temperature raising processing system, which increases a load acting on an engine to raise the exhaust gas temperature, includes an electric assist motor connected to the engine and an inverter for adjusting a torque of the electric assist motor. It also includes a main controller having a first determination unit for determining whether or not an actuator control valve is in a non-feed state and a second determination unit for determining whether or not clogging has occurred on a filter of an exhaust gas purification system. When the non-feed state is determined by the first determination unit and clogging is determined to have occurred on the filter by the second determination unit, the main controller drives the electric assist motor to generate electric power such that a load acting on the engine is increased.

3 Claims, 4 Drawing Sheets (51) Int. Cl.
*F16D 31/02* (2006.01)
*F04B 7/00* (2006.01)
*B60K 6/485* (2007.10)
*B60W 10/06* (2006.01)
*B60W 10/08* (2006.01)

(52) U.S. Cl.
CPC ......... *Y02T 10/6226* (2013.01); *Y02T 10/6286* (2013.01); *B60Y 2300/476* (2013.01)

(56) References Cited

FOREIGN PATENT DOCUMENTS

| | | | | |
|---|---|---|---|---|
| JP | 07166840 A | * | 6/1995 | ................ F01N 3/02 |
| JP | 3073380 B2 | | 8/2000 | |
| JP | 2004-92428 A | | 3/2004 | |
| JP | 2010-59620 A | | 3/2010 | |
| JP | 2010-77727 A | | 4/2010 | |

* cited by examiner

HYDRAULIC WORKING MACHINE

TECHNICAL FIELD

This invention relates to a hydraulic working machine, such as a hydraulic excavator, provided with an exhaust gas purification system for trapping particulate matter in exhaust gas produced from an engine.

BACKGROUND ART

As a conventional technology of this kind, there is one disclosed in Patent Document 1. The conventional technology disclosed in Patent Document 1 is provided with an engine, a variable displacement hydraulic pump drivable by power transmitted from the engine, and a hydraulic actuator drivable by pressure oil delivered from the variable displacement hydraulic pump. In addition, the conventional technology is also provided with an actuator control valve and an exhaust gas purification system. The actuator control valve controls a flow of pressure oil to be fed from the variable displacement hydraulic pump to the hydraulic actuator, and is switchable between a feed state in which the pressure oil delivered from the variable displacement hydraulic pump is to be fed to the hydraulic actuator and a non-feed state in which the pressure oil is returned to a hydraulic oil reservoir without feeding it to the hydraulic actuator. The exhaust gas purification system has a filter for trapping particulate matter in exhaust gas produced from the engine. Further, this conventional technology is also provided with an exhaust gas temperature raising processing means for performing, when the actuator control valve is in the above-mentioned non-feed state and clogging has occurred on the filter of the exhaust gas purification system, processing to increase a load acting on the engine such that a temperature of the exhaust gas is raised to a temperature needed to burn the particulate matter. This exhaust gas temperature raising processing means is configured to include a selector valve, which is openable or closable to communicate or cut off a line through which the pressure oil delivered from the variable displacement hydraulic pump is guided to the hydraulic oil reservoir.

According to this conventional technology, when the actuator control valve is in the non-feed state and clogging has occurred on the filter of the exhaust gas purification system, the selector valve is switchingly controlled to a closed position. As a consequence, the line that connects the variable displacement hydraulic pump and the hydraulic oil reservoir to each other is cut off, so that the pressure in a line section that connects the selector valve and the variable displacement hydraulic pump to each other, in other words, the pump delivery pressure becomes high, and therefore, the load acting on the engine increases. As a result, the temperature of exhaust gas from the engine rises to burn particulate matter contained in the exhaust gas.

PRIOR ART DOCUMENTS

Patent Documents

Patent Document 1: JP-B-3073380

DISCLOSURE OF THE INVENTION

Problem to Be Solved by the Invention

When the burning of particulate matter in exhaust gas is needed, the above-mentioned conventional technology increases the load on the engine to raise the temperature of the exhaust gas so that the particulate matter in the exhaust gas can be burnt. However, the non-feed state of the actuator control valve corresponds to a non-working state in which work is not being performed by an actuation of the hydraulic actuator. Considering from the viewpoint of energy savings, it is, therefore, not desired to increase the load on the engine to increase the output of the engine in such a non-working state. With the foregoing in view, it has been desired to reduce an energy loss upon increasing the load on the engine to burn particulate matter during the non-feed state of the actuator control valve.

It is also desired to raise the temperature of exhaust gas to a minimum necessary temperature sufficient to burn particulate matter upon increasing the load on the engine to raise the temperature of exhaust gas as mentioned above. With a technology that increases the pressure in a line section by closing control of a selector valve as in the conventional technology, there is, however, a tendency that the load on the engine increases more than necessary and the temperature of exhaust gas rises to a temperature higher than the minimum necessary temperature. In this respect, the conventional technology tends to produce an energy loss.

With the above-mentioned actual situation of the conventional technology in view, the present invention has as an object thereof the provision of a hydraulic working machine capable of recovering, as electric power, energy to be used to increase a load on an engine upon burning particulate matter in exhaust gas.

Means for Solving the Problem

To achieve this object, the present invention is characterized in that in a hydraulic working machine provided with an engine, a variable displacement hydraulic pump drivable by power transmitted from the engine, a hydraulic actuator drivable by pressure oil delivered from the variable displacement hydraulic pump, an actuator control valve for controlling a flow of pressure oil, which is to be fed from the variable displacement hydraulic pump to the hydraulic actuator, to permit switching between a feed state in which pressure oil delivered from the variable displacement hydraulic pump is to be fed to the hydraulic actuator and a non-feed state in which the pressure oil is returned to a hydraulic oil reservoir without feeding the pressure oil to the hydraulic actuator, an exhaust gas purification system having a filter for trapping particulate matter in exhaust gas produced from the engine, and an exhaust gas temperature raising processing means for performing, when the actuator control valve is in the non-feed state and clogging has occurred on the filter, processing to increase a load acting on the engine such that a temperature of the exhaust gas is raised to a temperature needed to burn the particulate matter, the exhaust gas temperature raising processing means comprises an electric assist motor connected to an output shaft of the engine, an inverter for adjusting a torque of the electric assist motor, and an inverter control device for controlling the inverter; and a main controller having a first determination means for determining whether or not the actuator control valve is in the non-feed state and a second determination means for determining whether or not clogging has occurred on the filter of the exhaust gas purification system, wherein, when the non-feed state is determined by the first determination means and clogging is determined to have occurred on the filter by the second determination means, the main controller outputs, to the inverter control device, a control signal for driving the electric assist motor to increase the load acting on the engine and another control signal for generating electric power by the electric assist motor.

According to the present invention constructed as described above, when the actuator control valve is determined to be in the non-feed state by the first determination means of the main controller, in other words, the hydraulic working machine is determined to be in a non-working state in which the hydraulic working machine is not performing work and clogging is determined to have occurred on the filter of the exhaust gas purification system by the second determination means, the main controller drives the electric assist motor to increase the load acting on the engine. At this time, the generation of electric power is performed by the electric assist motor. Accordingly, the electric power by the electric power generation, in other words, the energy to be used to increase the load on the engine upon burning particulate matter in exhaust gas can be recovered as electric power and the electric power can be utilized for driving the hydraulic working machine. Further, the lowest exhaust gas temperature sufficient to burn particulate matter in exhaust gas, in other words, the minimum necessary temperature depends on the magnitude of a load on the engine, and the magnitude of the load on the engine can be controlled with high accuracy by controlling the torque of the electric assist motor. In other words, upon burning particulate matter in exhaust gas as mentioned above, the present invention can control the load on the engine with high accuracy such that a minimum necessary temperature sufficient to burn the particulate matter can be maintained.

The present invention may also be characterized in that in the above-described invention, the hydraulic working machine further comprises a capacitor for storing the electric power generated by the electric assist motor. The present invention constructed as described above can drive the electric assist motor to assist the driving of the engine by feeding the electric power, which is stored in the capacitor, to the electric assist motor via the inverter.

The present invention may also be characterized in that in the above-described invention, the hydraulic working machine further comprises a resistance wire arranged in the exhaust gas purification system to burn the particulate matter in the exhaust gas, current branch circuits for selectively connecting the inverter and one of the capacitor and resistance wire to each other, and a branch control device connected to the main controller for controlling an operation of the current branch circuits, wherein the main controller comprises a third determination means for determining whether or not the capacitor is overcharged and, when the capacitor is determined to be overcharged by the third determination means, the main controller performs processing to control the branch control device such that the inverter and the resistance wire are connected to each other.

According to the present invention constructed as described above, the resistance wire arranged in the exhaust gas purification system can be made to generate heat by the electric power generated by the electric assist motor when the storage level of the capacitor exceeds the upper limit storage capacity. Therefore, the particulate matter in the exhaust gas can also be burnt by the production of heat from the resistance wire.

Advantageous Effects of the Invention

As the exhaust gas temperature raising processing means is configured to comprise the electric assist motor connected to the output shaft of the engine, the inverter for adjusting the torque of the electric assist motor, the inverter control device for controlling the inverter, and the main controller for controlling the inverter control device, the present invention makes it possible to recover, as electric power available from electric power generation by the electric assist motor, energy to be used to increase the load on the engine upon burning the particulate matter in exhaust gas. Therefore, this electric power can be utilized for driving the hydraulic working machine, thereby making it possible to reduce, compared with before, the energy loss upon increasing the load on the engine to burn the particulate matter. Upon burning the particulate matter in the exhaust gas, the output of the engine can be controlled with high accuracy to maintain a minimum necessary temperature sufficient to burn the particulate matter in the exhaust gas by controlling the electric assist motor via the inverter. In this respect, it is also possible to reduce, compared with before, the energy loss upon increasing the load on the engine to burn the particulate matter.

MODES FOR CARRYING OUT THE INVENTION

One embodiment of the hydraulic working machine according to the present invention will hereinafter be described with reference to the drawings.

Figure 1:
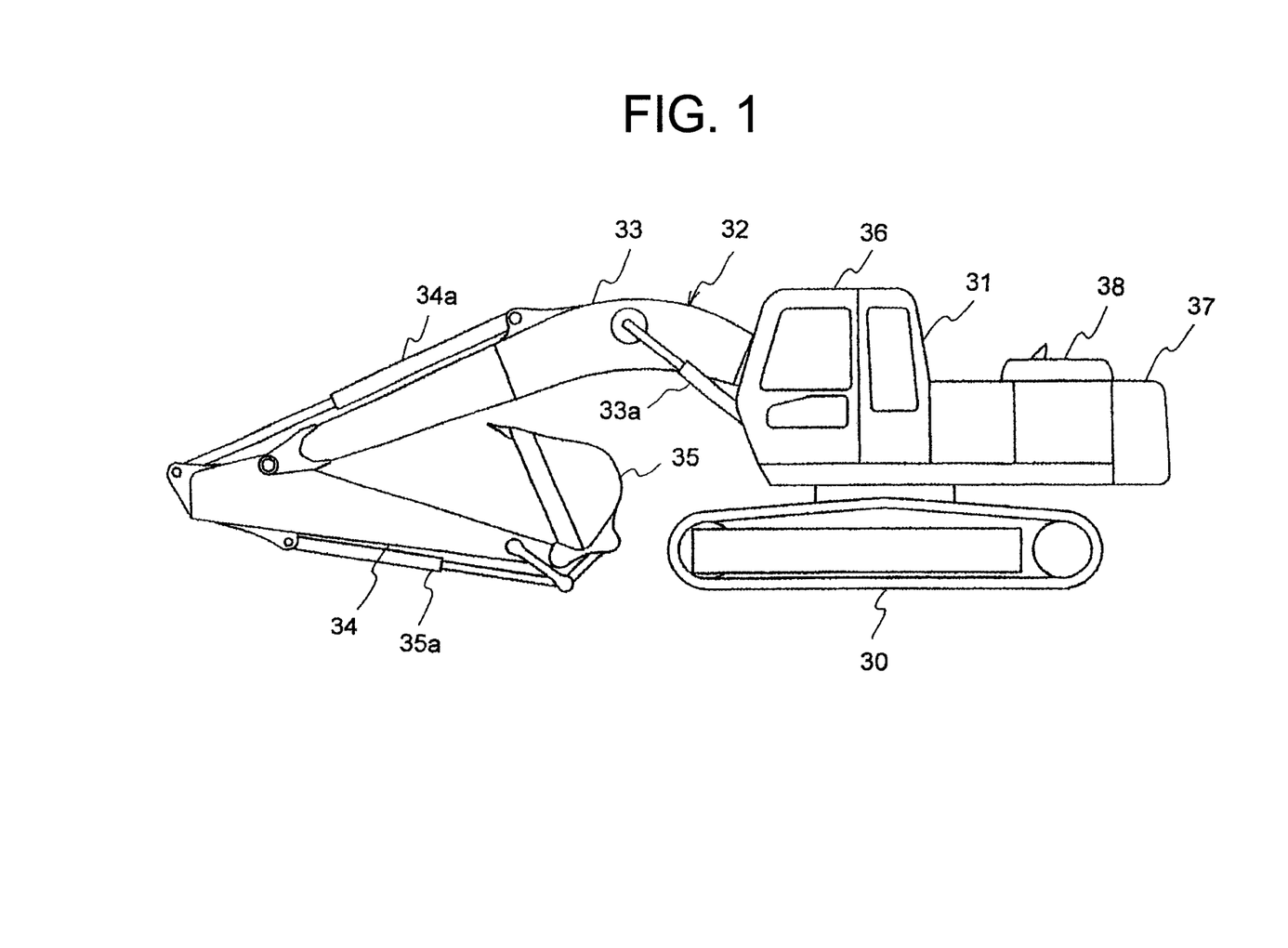
FIG. 1 is a side view showing a hydraulic excavator as one embodiment of the hydraulic working machine.

FIG. 1 is a side view showing a hydraulic excavator as one embodiment of the hydraulic working machine. As shown in FIG. 1, the hydraulic excavator according to this embodiment is provided with a travel base 30, an upperstructure 31 arranged on the travel base 30, and working equipment 32 attached tiltably in an up-and-down direction to the upperstructure 31. The working equipment 32 includes a boom 33 attached tiltably in the up-and-down direction to the upperstructure 31, an arm 34 attached tiltably in the up-and-down direction to a free end of the boom 33, and a bucket 35 attached tiltably in the up-and-down direction to a free end of the arm 34. In addition, the working equipment 32 also includes hydraulic cylinders, specifically hydraulic actuators such as a boom cylinder 33a for actuating the boom 33, an arm cylinder 34a for actuating the arm 34, and a bucket cylinder 35a for actuating the bucket 35. An operator's cab 36 is arranged on the upperstructure 31 at a forward position thereof, and a counterweight 37 is arranged on the upperstructure 31 at a rear position thereof. Arranged between the operator's cab 36 and the counterweight 37 is an engine compartment 38, in which an engine 2, a variable displacement hydraulic pump 4 and the like, which will be described subsequently herein, are accommodated.

Figure 2:
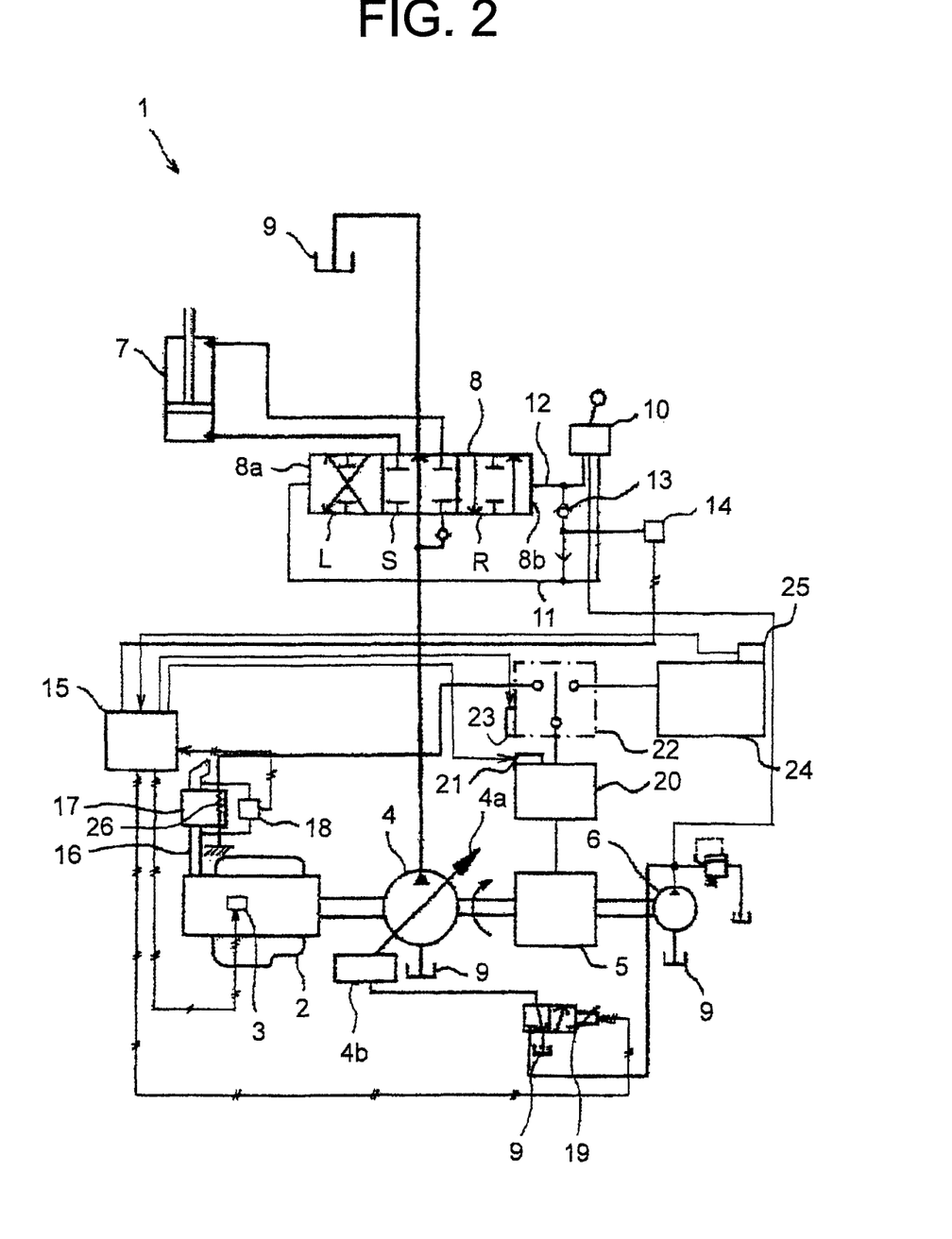
FIG. 2 is a circuit diagram illustrating a drive system arranged in the hydraulic excavator according to this embodiment.
Figure 3:
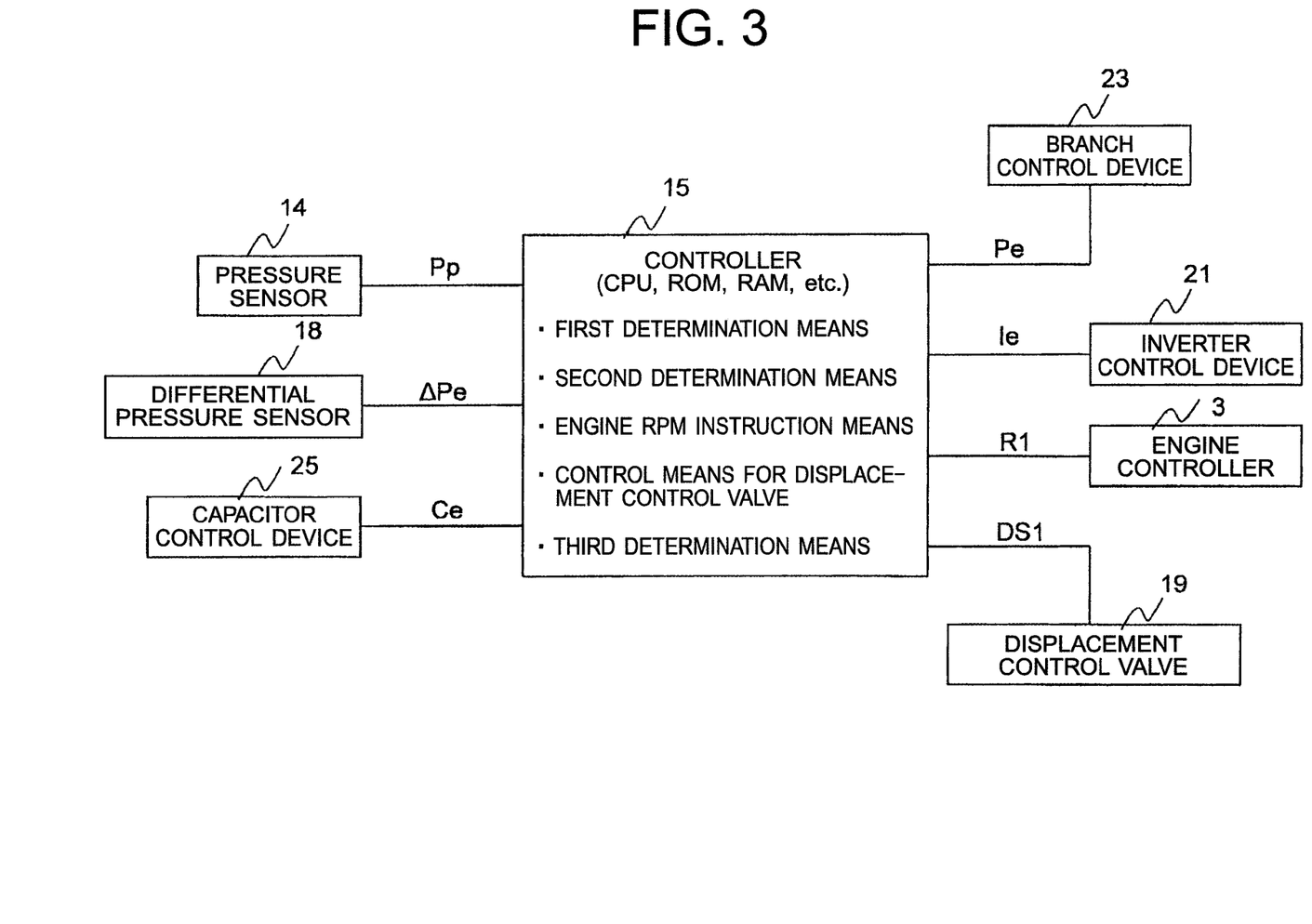
FIG. 3 is a block diagram depicting the construction of an essential part of the drive system illustrated in FIG. 2.

FIG. 2 is a circuit diagram illustrating a drive system arranged in the hydraulic excavator according to this embodiment, and FIG. 3 is a block diagram depicting the construction of an essential part of the drive system illustrated in FIG. 2.

As shown in FIG. 2, the drive system 1 arranged in the hydraulic excavator according to this embodiment is provided with the engine 2 electronically controlled in fuel injection quantity by an engine controller 3, the variable displacement hydraulic pump 4 drivable by power transmitted from the engine 2, and a pilot pump 6. In addition, the drive system 1 is also provided with a hydraulic actuator 7 drivable by pressure oil delivered from the variable displacement hydraulic pump 4 and an actuator control valve 8 for controlling pressure oil to be fed from the variable displacement hydraulic pump 4 to the hydraulic actuator 7. The actuator control valve 8 is switchable between a feed state, in which the pressure oil delivered from the variable displacement hydraulic pump 4 is fed to the hydraulic actuator 7, and a non-feed state, in which the pressure oil is not fed to the hydraulic actuator 7 but is returned to a hydraulic oil reservoir 9. It is to be noted that only the single actuator 7 is illustrated to facilitate the description although the hydraulic excavator is provided with various hydraulic actuators such as unillustrated swing motor and travel motors in addition to hydraulic cylinders such as the above-mentioned boom cylinder 33a and arm cylinder 34a. Concerning actuator control valves actually arranged for the hydraulic actuators, respectively, only the single actuator control valve 8 is correspondingly illustrated to facilitate the description.

The actuator control valve 8 is a 3-position valve. In a neutral position S out of its three valve positions, the actuator control valve 8 is in the non-feed state in which as illustrated in FIG. 1, the pressure oil delivered from the variable displacement hydraulic pump 4 is returned to the hydraulic oil reservoir 9. In each of valve positions L,R on left and right sides of the neutral position S, the actuator control valve 8 is in the feed state in which the pressure oil delivered from the variable displacement hydraulic pump 4 is fed to the hydraulic actuator 7.

The actuator control valve 8 is also a hydraulically-piloted valve. A pilot pressure to be applied to the actuator control valve 8 is produced by a control device 10, which includes a pilot valve, while using as a primary pressure a delivery pressure of the pilot pump 6. The actuator control valve 8 is switched from the neutral position S toward the valve position L when a pilot pressure is applied from the control device 10 to a first pressure receiving portion 8a via a first pilot line 11, but is conversely switched from the neutral position S toward the valve position R when a pilot pressure produced by the control device 10 is applied to a second pressure receiving portion 8b via a second pilot line 12.

The first and second pilot lines 11,12 are connected to a high pressure selector valve 13. A pressure on a high pressure side as selected by the high pressure selector valve 13 is detected by a pressure sensor 14. This pressure sensor 14 is constructed to convert a detected pressure Pp to a pilot pressure signal (electrical signal), and is arranged to input this pilot pressure signal to a main controller 15.

The engine 2 is provided with an exhaust pipe 16 through which exhaust gas is guided to an exterior of the hydraulic excavator. This exhaust pipe 16 is provided at an intermediate position thereof with an exhaust gas purification system 17 which traps, on a filter, particulate matter in exhaust gas produced by combustion in the engine 2.

The exhaust pipe 16 is provided with a sensor means for detecting clogging of the filter of the exhaust gas purification system 17, specifically a differential pressure sensor 18 for detecting a differential pressure between an exhaust gas pressure on an upstream side of the exhaust gas purification system 17 and an exhaust gas pressure on a downstream side of the exhaust gas purification system 17. When the clogging amount of the filter of the exhaust gas purification system 17 increases, the flow path resistance to the exhaust gas increases so that the exhaust gas pressure on the upstream side becomes higher than the exhaust gas pressure on the downstream side. Accordingly, the differential pressure sensor 18 detects a differential pressure indicating that the exhaust gas pressure on the upstream side is higher than that on the downstream side. The differential pressure sensor 18 is constructed to convert a detected differential pressure $\Delta Pe$ to a differential pressure signal (electrical signal). This differential pressure signal is inputted to the main controller 15.

The variable displacement hydraulic pump 4 has a displacement varying mechanism 4a and a hydraulically-piloted regulator 4b. The displacement varying mechanism 4a enables to vary the displacement of the variable displacement hydraulic pump 4, and the hydraulically-piloted regulator 4b controls this displacement varying mechanism 4a. A pilot pressure to be applied to the regulator 4b is produced by a displacement control valve 19. Using a delivery pressure of the pilot pump 6 as a primary pressure, the displacement control valve 19 produces the pilot pressure. This displacement control valve 19 is a solenoid valve, and responsive to a displacement control signal (electric current) from the main controller 15, varies the pilot pressure to be applied to the regulator 4b.

The hydraulic excavator according this embodiment is provided with an exhaust gas temperature raising processing means. When the actuator control valve 8 is in the non-feed state and clogging has occurred on the filter of the exhaust gas purification system 17, the exhaust gas temperature raising processing means performs processing to increase a load acting on the engine 2 such that the temperature of the exhaust gas is raised to a temperature needed to burn the particulate matter contained in the exhaust gas. This exhaust gas temperature raising processing means includes an electric assist motor 5 connected to an output shaft of the engine 2, an inverter 20 for adjusting a torque of the electric assist motor 5, an inverter control device 21 drivable by a signal le outputted from the main controller 15 to control the inverter 20, and the above-mentioned main controller. The main controller 15 has CPU, ROM and RAM, and is provided with a first determination means and second determination means constructed by these CPU, ROM and RAM. The first determination means determines whether or not the actuator control valve 8 is in the non-feed state, while the second determination means determines whether or not clogging has occurred on the filter of the exhaust gas purification system 17. When the non-feed state is determined by the first determination means and clogging is determined to have occurred on the filter by the second determination means, the main controller 15 outputs, to the inverter control device 21, a control signal for driving the electric assist motor 5 to increase the load acting on the engine 2 and another control signal for generating electric power by the electric assist motor 5.

The inverter 20 converts, to a direct current, an alternating current generated by the electric assist motor 5, and also controls the output of electric power from the electric assist motor 5 by an electrical signal from the main controller 15 via the inverter control device 21.

Further, the hydraulic excavator according to this embodiment is also provided with a capacitor 24, a resistance wire (heating wire) 26, current branch circuits 22, and a branch control device 23. The capacitor 24 stores the electric power generated by the electric assist motor 5. The resistance wire (heating wire) 26 is arranged in the exhaust gas purification system 17 to heat and burn the particulate matter in the exhaust gas. The current branch circuits 22 selectively connect the inverter 20 and one of the capacitor 24 and resistance wire 26 to each other. The branch control device 23 is connected to the main controller 15 to control an operation of the current branch circuits 22. In addition, the main controller 15 includes a third determination means for determining whether or not the capacitor 24 is overcharged and, when the capacitor 24 is determined to be overcharged by the third determination means, performs processing to control the branch control device 23 such that the inverter 20 and the resistance wire 26 are connected to each other.

The main controller 15 is provided, as mentioned above, with the first determination means for determining whether or not the actuator control valve 8 is in the non-feed state. This first determination means determines whether or not a detected pressure Pp indicated by a pilot pressure signal from the pressure sensor 14 is lower than a preset pressure Pps below which the actuator control valve 8 is to be actuated, in other words, whether a state of the actuator control valve 8 is the feed state, in which pressure oil from the variable displacement hydraulic pump 4 is fed to the hydraulic actuator 7, or the non-feed state, in which the pressure oil is not fed to the hydraulic actuator 7. The feed state corresponds to a working state in which work is being performed by the hydraulic excavator, while the non-feed state corresponds to a non-working state in which work is not being performed by the hydraulic excavator. It is, therefore, designed such that whether the hydraulic excavator is in a working state or in a non-working state can be detected by the high pressure selector valve 13, pressure sensor 14 and main controller 15.

Further, the main controller 15 is also provided with the second determination means for determining whether or not clogging has occurred on the filter of the exhaust gas purification system 17 as mentioned above. This second determination means determines whether or not a detected differential pressure ΔPe indicated by a differential pressure signal from the differential pressure sensor 18 is not lower than a preset reference differential pressure ΔPes. As a result of clogging of the filter of the exhaust gas purification system 17, the flow path resistance to exhaust gas increases so that the detected differential pressure ΔPe becomes higher. It is, therefore, designed such that clogging of the filter of the exhaust gas purification system 17 can be detected by the differential pressure sensor 18 and main controller 15.

The main controller 15 is also provided with an engine rpm instruction means. This engine rpm instruction means delivers a preset first target rpm signal R1 to the engine controller 3. The first target rpm is, with a view to energy savings, an rpm set to lower the rpm of the engine 2 to a level needed for the variable displacement hydraulic pump 4 to deliver pressure oil at a lowest delivery rate required for cooling and lubricating a hydraulic circuit included in the drive system 1.

The main controller 15 is also provided with a control means for the displacement control valve. This control means for the displacement control valve delivers a first displacement control signal DS1, which corresponds to a preset first displacement, to the displacement control valve 19. When the displacement control valve 19 applies to the regulator 4b a pilot pressure responsive to the first displacement control signal DS1, the regulator 4b operates the displacement varying mechanism 4a to set the displacement of the variable displacement hydraulic pump 4 at the first displacement. When the variable displacement hydraulic pump 4 is driven by the engine 2 operated at the above-mentioned first target rpm in the state in which the variable displacement hydraulic pump 4 is set at the first displacement volume, the variable displacement hydraulic pump 4 delivers pressure oil at the above-mentioned lowest delivery rate.

The main controller 15 is also provided with the third determination means for determining whether or not the capacitor 24 is overcharged as mentioned above. This third determination means determines whether or not the value We of a storage level signal Ce from a capacitor control device 25 is not smaller than an upper limit storage capacity Wes. In other words, the capacitor 24 is detected to be in a fully charged state by the main controller 15 and capacitor control device 25.

Figure 4:
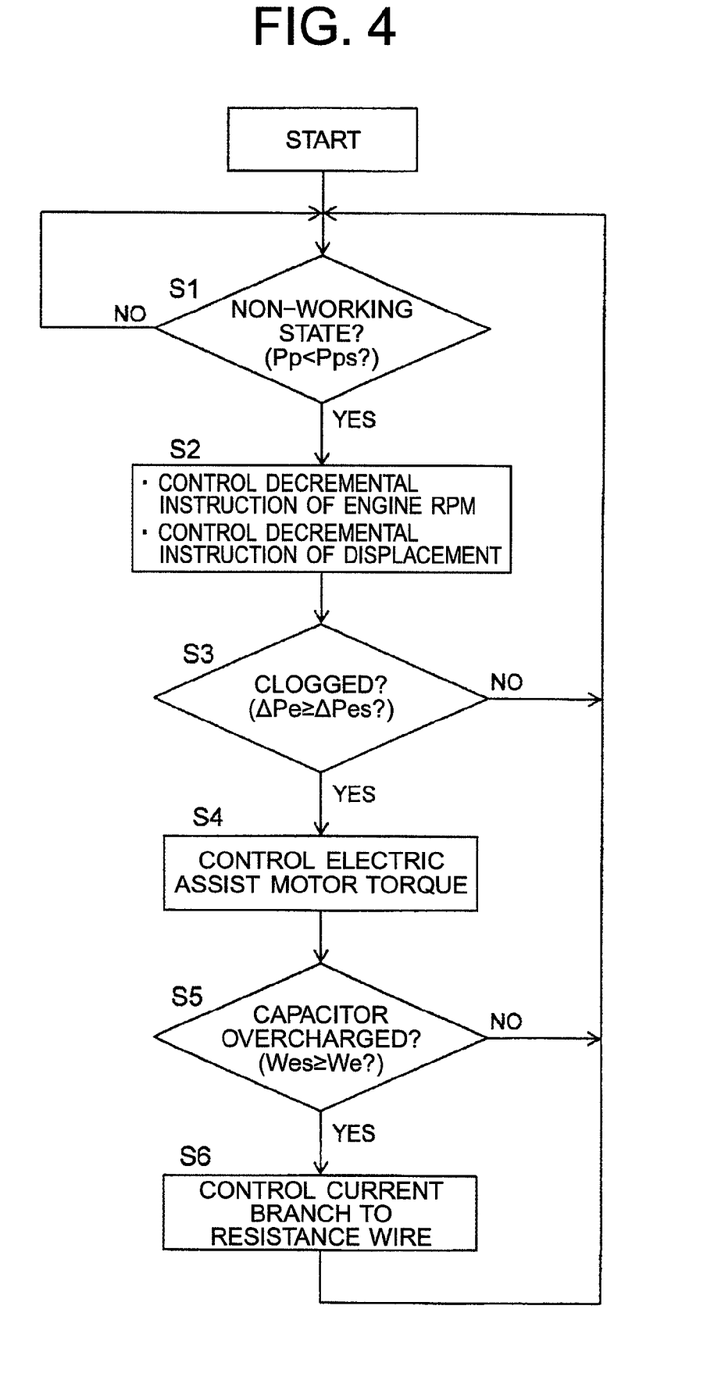
FIG. 4 is a flow chart showing a processing routine in a main controller arranged in the drive system illustrated in FIG. 2.

FIG. 4 is a flow chart showing a processing routine in a main controller arranged in the drive system illustrated in FIG. 2.

The main controller 15 first functions as the first determination means for determining whether or not the actuator control valve 8 is in the non-feed state, and determines whether or not a detected pressure Pp indicated by a pilot pressure signal from the pilot pressure sensor 14 is lower than a preset pressure Pps (step S1). The main controller 15 repeatedly performs this determination at the first determination means in step S1 unless the detected pressure Pp drops below the preset pressure Pps, in other words, until the hydraulic excavator can be considered to be in the non-working state.

When the determination at the first determination means results in "YES" and the non-working state is indicated, the main controller 15 functions as the engine rpm instruction means and the control means for the displacement control valve, and delivers a first target rpm signal R1 to the engine controller 3 and also delivers a first displacement control signal DS1 to the displacement control valve 19 (step S2). At this time, the valve position of the actuator control valve 8 is the neutral position S. When the rpm of the engine 2 reaches the first target rpm and the displacement reaches the first displacement, the variable displacement hydraulic pump 4 is, therefore, brought to a state in which pressure oil is delivered at a lowest delivery pressure and a lowest delivery rate required for cooling and lubricating the hydraulic circuit included in the drive system 1.

In the state as described above, the main controller 15 functions as the second determination means for determining whether or not clogging has occurred on the filter of the exhaust gas purification system 17, and determines whether or not a detected differential pressure ΔPe indicated by a differential pressure signal from the differential pressure sensor 18 is not smaller than the reference differential pressure ΔPes (step S3). When no clogging has occurred on the filter of the exhaust gas purification system 17, step S1→step S2→step S3→step S1 is repeated.

When the detected differential pressure ΔPe is determined to be not lower than the reference differential pressure ΔPes in step S3, that is, clogging has occurred on the filter of the exhaust gas purification system 17, the main controller 15 delivers to the inverter control device 21 a target torque signal le for the electric assist motor, and increases the torque of the electric assist motor 5 to a preset target torque (step S4). As a result of the increase in the torque of the electric assist motor 5, the load on the engine 2 increases so that the temperature of exhaust gas from the engine 2 rises, for example, to a lowest temperature needed to burn particulate matter trapped in the filter of the exhaust gas purification system 17. During this time, the electric assist motor 5 generates electric power by the load applied to the engine 2, and the resulting alternating current is converted by the inverter 20 to a direct current, which is then stored in the capacitor 24.

In the state as described above, the main controller 15 functions as the third determination means for determining whether or not the capacitor 24 is overcharged. When a detected storage level We of the capacitor 24 exceeds the upper limit storage capacity Wes, the main controller 15 delivers a control signal to the branch control device 23 to perform control such that the inverter 20 and the resistance wire 26, which is arranged in the exhaust gas purification system 17, are connected to each other via the current branch circuits 22 (step S6). As a result, the resistance wire 26 generates heat, which is then utilized to burn the particulate matter in the exhaust gas as clogged on the filter of the exhaust gas purification system 17. After this step S6, the routine returns again to step S1, and the above-mentioned respective determinations and respective controls are continued.

According to the hydraulic excavator of this embodiment constructed as described above, when the actuator control valve 8 is determined to be in the non-feed state by the first determination means of the main controller 15, in other words, the hydraulic excavator is determined to be in the non-working state and clogging is determined to have occurred on the filter of the exhaust gas purification system 17 by the second determination means, the main controller 15 drives the electric assist motor 5 such that the load acting on the engine 2 is increased. At this time, the generation of electric power is performed by the electric assist motor 5. Accordingly, the electric power by the electric power generation, in other words, the energy used to increase the load on the engine 2 upon burning the particulate matter in the exhaust gas can be recovered as electric power. The electric power can, therefore, be utilized to drive the hydraulic working machine, thereby making it possible to reduce the energy loss upon increasing the load on the engine 2 to burn the particulate matter. The lowest exhaust gas temperature sufficient to burn the particulate matter in the exhaust gas, in other words, the minimum necessary temperature depends on the magnitude of the load on the engine 2, and the magnitude of the load on the engine 2 can be controlled with high accuracy by controlling the torque of the electric assist motor 5. Upon burning the particulate matter in the exhaust gas as mentioned above, this embodiment can, therefore, control the magnitude of the load on the engine 2 such that the minimum necessary temperature sufficient to burn the particulate matter can be maintained. In this respect, it is also possible to reduce the energy loss upon increasing the load on the engine 2 to burn the particulate matter.

This embodiment can also drive the electric assist motor 5 to assist the driving of the engine 2 by feeding the electric power, which is stored in the capacitor 24, to the electric assist motor 5 via the inverter 20. In other words, the energy, which is required to increase the load on the engine 2 upon burning the particulate matter, can be stored as electric power in the capacitor 24, and therefore, the electric power can be effectively utilized.

This embodiment can also make the resistance wire 26, which is arranged in the exhaust gas purification system 17, generate heat by the electric power generated by the electric assist motor 5 when the storage level We of the capacitor 24 exceeds the upper limit storage capacity Wes. Therefore, the particulate matter in the exhaust gas can also be burnt with the heat generated by the resistance wire 26, thereby making it possible to improve the burning efficiency of the particulate matter in the exhaust gas.

LEGEND

1 Drive system
2 Engine
4 Variable displacement hydraulic pump
5 Electric assist motor
7 Hydraulic actuator
8 Actuator control valve
9 Hydraulic oil reservoir
10 Control device
11 First pilot line
12 Second pilot line
13 High pressure selector valve
14 Pressure sensor
15 Main controller
16 Exhaust pipe
17 Exhaust gas purification system
18 Differential pressure sensor
20 Inverter
21 Inverter control device
22 Current branch circuits
23 Branch control device
24 Capacitor
25 Capacitor control device
26 Resistance wire
30 Travel base
31 Upperstructure
32 Working equipment
We Storage level
Wes Upper limit storage capacity
Pp Detected pressure
Pps Preset pressure
$\Delta Pe$ Detected differential pressure
$\Delta Pes$ Reference differential pressure

The invention claimed is:
1. A hydraulic working machine, comprising:
an engine,
a variable displacement hydraulic pump drivable by power transmitted from the engine,
a hydraulic actuator drivable by pressure oil delivered from the variable displacement hydraulic pump,
an actuator control valve for controlling a flow of pressure oil fed from the variable displacement hydraulic pump to the hydraulic actuator the actuator control valve being arranged to permit switching between a feed state in which pressure oil delivered from the variable displacement hydraulic pump is to be fed to the hydraulic actuator and a non-feed state in which the pressure oil is returned to a hydraulic oil reservoir without feeding the pressure oil to the hydraulic actuator,
an exhaust gas purification system having a filter for trapping particulate matter in exhaust gas produced from the engine, and
an exhaust gas temperature raising processing means for performing, when the actuator control valve is in the non-feed state and clogging has occurred on the filter, processing to increase a load acting on the engine such that a temperature of the exhaust gas is raised to a temperature needed to burn the particulate matter,
wherein the exhaust gas temperature raising processing means includes:
an electric assist motor connected to an output shaft of the engine,
an inverter for adjusting a torque of the electric assist motor, and
a controller that respectively determines whether or not the actuator control valve is in the non-feed state and whether or not clogging has occurred on the filter of the exhaust gas purification system,
wherein, when the controller determines that the actuator control valve is in the non-feed state and clogging has occurred on the filter, the controller drives the electric assist motor to increase the load acting on the by controlling the inverter to adjust a torque of the electric assist motor so that electric power is generated by the electric assist motor, and wherein the controller lowers a target rpm of the engine to a level needed for the variable displacement hydraulic pump to deliver pressure oil at a lowest delivery rate required for cooling and lubricating a hydraulic circuit included in a drive system of the hydraulic working machine.

2. The hydraulic working machine according to claim 1, further comprising:
a capacitor for storing the electric power which has been generated by the electric assist motor by increasing the load acting on the engine to raise a temperature of the exhaust gas to a temperature needed to burn the particulate matter.

3. The hydraulic working machine according to claim 2, further comprising:
a resistance wire arranged in the exhaust gas purification system to burn the particulate matter in the exhaust gas, and
current branch circuits for selectively connecting the inverter and one of the capacitor and resistance wire to each other,
wherein the controller determines whether or not the capacitor is overcharged and, when the capacitor is determined to be overcharged, controls the current branch circuits to connect the inverter and the resistance wire to each other.

* * * * *